UNITED STATES PATENT OFFICE.

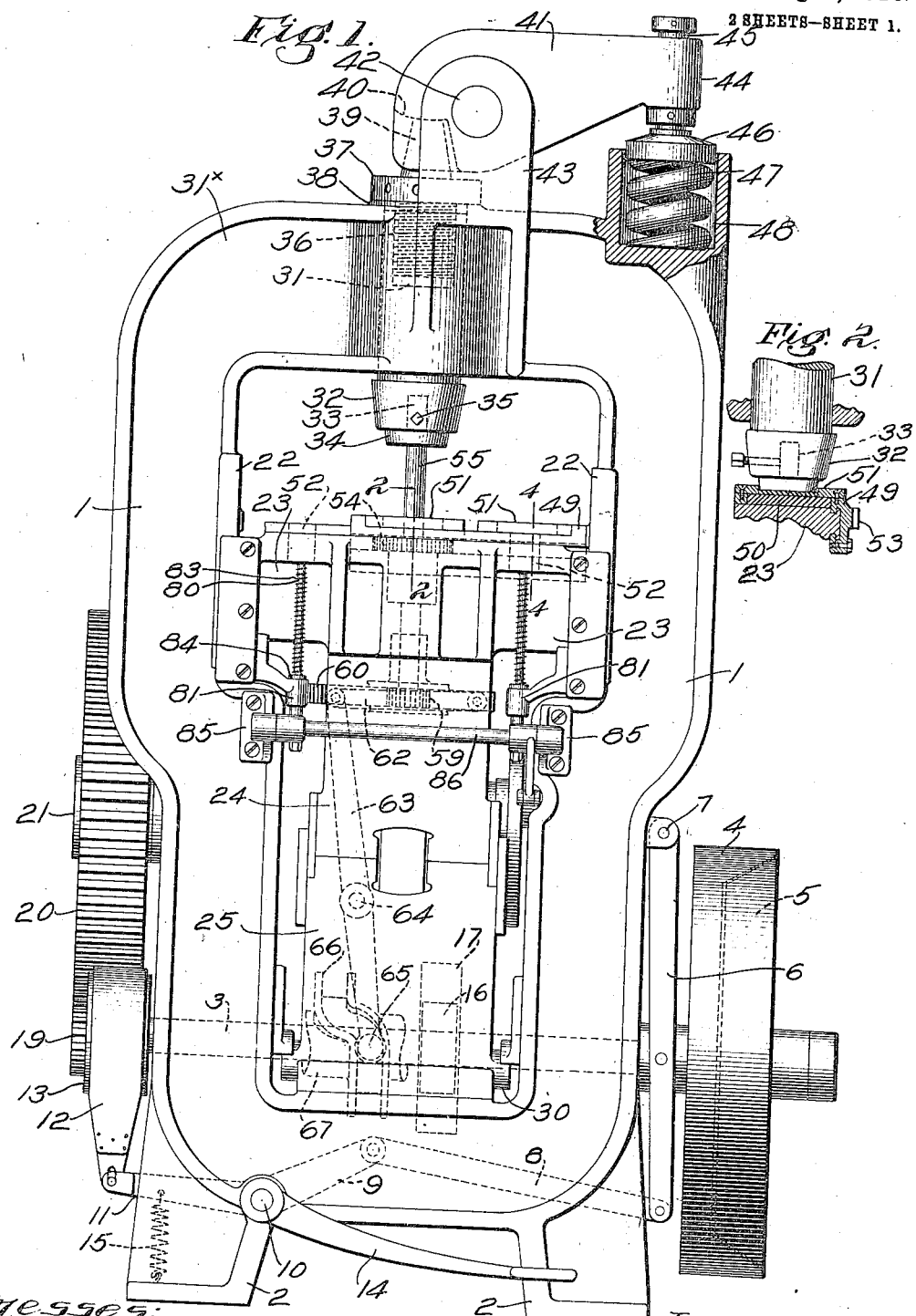

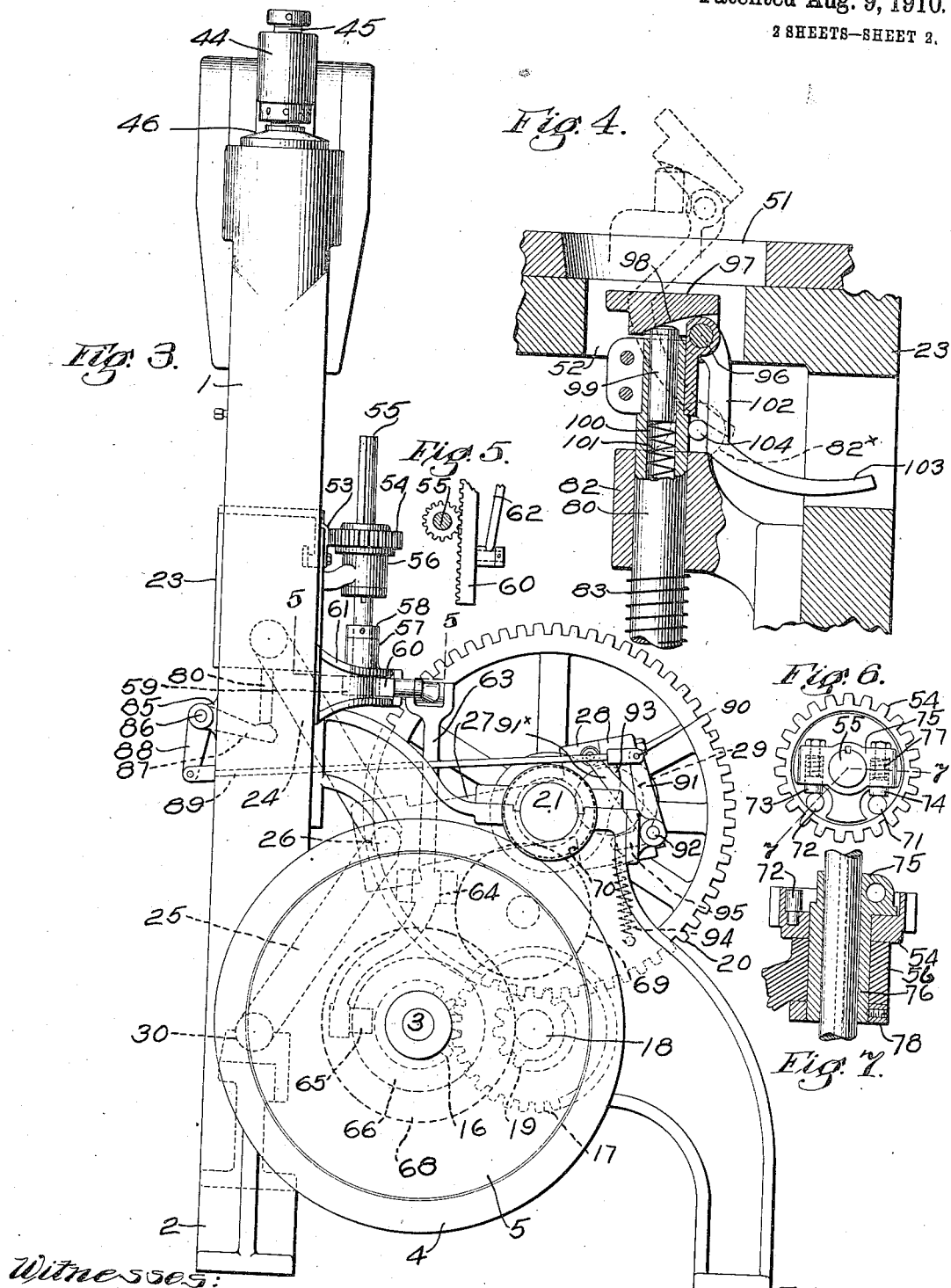

CHARLES P. STANBON, OF LYNN, MASSACHUSETTS, ASSIGNOR TO THOMAS G. PLANT, OF BOSTON, MASSACHUSETTS.

MACHINE FOR COMPRESSING TOP-LIFTS.

966,485.

Specification of Letters Patent.   Patented Aug. 9, 1910.

Application filed October 27, 1909. Serial No. 524,924.

*To all whom it may concern:*

Be it known that I, CHARLES P. STANBON, a citizen of the United States, residing at Lynn, in the county of Essex and State of Massachusetts, have invented an Improvement in Machines for Compressing Top-Lifts, of which the following description, in connection with the accompanying drawings, is a specification, like numerals on the drawings representing like parts.

The invention to be hereinafter described relates to compressing the toplifts of boot and shoe heels.

The aims and purposes of the present invention are to provide a simple and effective machine of the above general type, and wherein the toplifts, shaped to the desired form, may be subjected to a high degree of pressure upon its two opposite faces without, at the same time, compressing the edges, all of which will better appear from the following description and accompanying drawings of one form of means for putting the invention into practical effect.

In the drawings:—Figure 1 is a front elevation of a machine embodying the present invention; Fig. 2 is a detail section on the line 2—2, Fig. 1, showing the compression die or member bearing upon and compressing a toplift held in place on the cross-head; Fig. 3 is a side elevation of the machine shown in Fig. 1; Fig. 4 is an enlarged detail sectional view on the line 4—4, Fig. 1, showing the ejector, some of the parts being broken away; Fig. 5 is a detail section view on line 5—5, Fig. 3, showing the rack and pinion operating elements of the slide shaft; Fig. 6 is a top or plan view of the slide shaft pinion or gear; and Fig. 7 is a section on the line 7—7, Fig. 6.

The main supporting frame may be of suitable construction, one form thereof comprising the heavy side pieces 1 rising from a base 2 and having bearings for a driving shaft 3 carrying appropriate driving means. In the form of the invention illustrated the driving means comprises a pair of friction clutch members 4 and 5, one of which is, as usual, fixed to the shaft and the other loose thereon, the construction being such that they may be moved into and out of driving relation, as common in this class of devices and which, therefore, need not be further described in detail. The movable member of the clutch is suitably connected to a lever 6 pivoted at 7, said lever 6 being jointed to a link 8 which is itself connected to an arm 9 extending from the hub of a two-armed lever mounted on a shaft 10, the other arm 11 of said lever being connected to a brake band 12 encircling a brake wheel 13 secured to the shaft 3.

Connected to the two-armed lever is a treadle 14 upon depression of which against the action of the spring 15 the clutch members are engaged and the brake band relieved from its grasp of the brake wheel, and, conversely, when the treadle is released the clutch members will be disengaged and the brake band be caused to grasp the brake wheel, as will be clearly understood.

Mounted on the main shaft 3 is a gear 16 which engages a gear 17 on a counter shaft 18, said shaft 18 being provided also with a gear 19 which is operatively engaged with a gear 20 on the crank shaft 21, the construction being such that the crank shaft 21 is driven at reduced speed.

The inner side portions of the pieces 1 are provided with ways 22 which afford suitable guiding means for a cross-head 23 having jointed thereto one member of a toggle operated from the crank shaft. The toggle comprises the members 24 and 25 connected at 26 to an arm 27, the boxes 28 of which embrace the crank pin 29 of the crank shaft, and the member 25 of which has a bearing 30 on the main supporting frame such that said toggle members may not only cause reciprocation of the cross-head but may impart a very heavy compression to the toplift against the die or upper compression member, as will presently appear.

The upper cross arm 31* of the main frame has mounted therein the stem 31 of a suitable compression die carrier 32 having a recess in its face to accommodate the stem 33 of the compression die 34 which may be detachably connected to the die carrier 32 by suitable means, as the set screw 35, whereby compression dies of varying sizes or shapes may be employed suitable to the character of work being done or the form of the toplift. It will be noted that the compression die 34 has a broad bearing against the lower face of the die carrier 32 in order to properly withstand the strain of compression. The stem 31 is provided with an interior screw thread 36 in its upper portion which is engaged by the exterior screw threads on the stem of the supporting collar 37, the construction being such that by rotation of the supporting collar 37, which rests upon the seat 38 of the cross arm 31*, the position of the compression die with relation to the cross-head 23 may be readily adjusted.

Projecting up from the supporting collar 37 is a lug 39 against which rests the seat 40 of a lever 41 pivoted at 42 to the supports 43 extending from the cross arm. Adjustably mounted in the end 44 of the lever 41 is a stem having a seat 46 against which bears one end of a powerful spring 47 contained in the recess 48 of the cross arm 31*. From the construction described it will be apparent that the compression die may be supported in desired relation to the cross-head 23 to secure the proper compression of the toplift and that the powerful spring 47, acting on the long arm of the lever 41, maintains the compression die in such adjusted relation during the act of compressing the toplift, while at the same time permitting the compression die to yield in case the compression becomes excessive.

Mounted to move transversely of the cross-head 23 is a toplift slide 49, Figs. 1, 2, 3 and 4, said slide being mounted over a steel compression plate 50 carried by the cross-head and provided with a plurality of toplift carrying portions or sockets 51. The central portion of the cross-head 23 and the compression plate 50 afford a lower support for a toplift during the act of compression, as indicated in Fig. 2, but at each side of the central portion the cross-head is provided with an opening 52 for the passage of an ejector which serves to eject a toplift after it has been compressed and moved to one side of the cross-head center, Figs. 1 and 4.

As one means for moving the toplift slide transversely, said slide is provided with a rack 53, Figs. 2 and 3, the teeth of which engage the teeth of a gear 54 connected to the shaft 55 and supported by a suitable bracket 56 secured to and movable with the cross-head, the construction being such that the gear 54 may be turned by the shaft 55 while free to move up and down with the cross-head.

The shaft 55 extends into a lower bearing 57 and is supported by a collar 58, the lower end of said shaft being provided with a gear 59 operatively connected to a rack 60 held in suitable bearings sustained by a bracket 61 projecting from the machine frame. The rack is connected to a link 62, which is jointed to the upper end of an actuator 63 pivotally mounted at 64 and having a pin or roller 65 at its lower end, Figs. 1 and 3, running in the groove of a cam 66 mounted on a sleeve 67 loose upon the shaft 3, Fig. 1.

It is desirable that the cam 66 move more slowly than the shaft 3 and be suitably timed with relation to it and the crank shaft to effect proper movement of the toplift slide, and as one means to this end the sleeve 67 carrying the cam 66 is shown as driven from the crank shaft through a train of suitable gears 68, 69 and 70, shown by dotted lines, Fig. 3, although other driving means may readily be substituted by those skilled in the art.

Referring to Figs. 6 and 7, it will be noted that the toplift slide gear 54 is connected to the shaft 55 by means which will permit some little relative rotative movement of the shaft and gear when the toplift slide is obstructed in its movement. The stroke of the actuator 63 is constant, and, as the toplift slide must be moved the proper distance to bring a toplift into compressing position and another into ejecting position regardless of wear between the teeth of the rack 53 and gear 54, and other parts, provision is made to give the actuator 63 and perforce the shaft 55, a somewhat greater movement than is necessary to properly move the slide when the parts are not worn. One form of such means is shown in Figs. 6 and 7, wherein the gear 54 is provided with two pins 71 and 72 which bear against the ends of yielding plungers 73, 74, carried by the head 75 of a sleeve 76 which is splined to the shaft 55. The plungers 73 and 74 are held to the head 75 by means of nuts, as shown by Fig. 6, suitable springs 77 surrounding said plungers and acting normally to project them. The sleeve 76 on which the gear 54 is mounted is preferably provided with a collar 78 bearing under the end of the bracket 56 as a convenient means to confine the sleeve and the gear 54 to the bracket 56 and cause said parts to rise and fall together, as will be readily understood.

From the construction described it will be apparent that after the actuator 63 has turned the shaft 55 a sufficient distance to carry the toplift slide to the end of its stroke, the said shaft may turn somewhat even though the gear 54 and toplift slide are immovable.

As hereinbefore stated, the cross-head 23 has two side openings 52, and disposed below each of said openings in the cross-head is a toplift ejector. Since the toplift is subjected to a high degree of compression between its two surfaces, it is liable to stick in the recess of the slide and the ejectors are disposed and operated to the end that each toplift may be suitably ejected from the slide when it is moved thereby into ejecting position, as will now be explained.

The two ejectors, one disposed at each side of the center of the cross-head, are alike in construction so that the description and operation of one will serve for both. Each ejector comprises a rod 80 sustained by a suitable bearing 81 projecting from the cross-head 23 adjacent the lower portion of said ejectors, and each ejector also passes through an upper bearing 82, Fig. 4, secured to the cross-head near its upper part, a spring 83 surrounding each ejector and bearing at its lower end against a collar 84 secured to the ejector and at its upper end against the under part of the upper bearing 82, serving normally to hold the ejectors 80 depressed.

Pivotally mounted in suitable brackets 85, Figs. 1 and 3, projecting from the main frame is a rock shaft 86 carrying the arms 87 and 88, the former being in position to engage the lower end of the ejectors, when the cross-head is in its lowered position, and the latter being connected to a rod 89 jointed at 90 to a dog 91 pivoted at 92 to a suitable support connected to the machine frame, as indicated in Fig. 3.

Secured to the crank shaft is a cam 93 which is disposed with relation to an arm 91$^x$ movable with the dog 91 so that it will engage said arm and move it and the dog to the right about its pivotal support 92 to thereby cause the arms 87 of the rock shaft 86 to rise and move the ejectors upwardly, as will be readily understood. A spring 94, Fig. 3, acts normally on the toe 95 connected to the dog 91 in a manner such that the dog 91 is normally held in position to the left, as indicated in Fig. 3, when its actuating cam 93 is not causing opposite movement thereof.

From the construction thus far described it will be apparent that after the cross-head has risen in response to the toggle and its operating means and a toplift has been compressed, the cross-head will be lowered and the toplift slide will be moved transversely thereof by its actuating means to place the compressed toplift over one of the openings 52 in the cross-head and to carry another toplift, previously placed in the other opening 51 of the toplift slide, into position over the center of the cross-head for the compressing action. As the cross-head reaches its lowered position, the dog 91 is actuated and the ejectors are raised to eject the compressed toplift, one of said ejectors acting idly in the opening 52 over which no toplift is positioned.

It is desirable not only that the toplifts be ejected from the toplift slide, but that they be given a movement to throw them from the machine into a suitable receptacle and to this end each of the ejectors has hinged at its upper portion, as at 96, Fig. 4, a toplift throwing device. In the present form of the invention the toplift throwing device comprises a plate 97 hinged at 96 and having a flat upper surface and a rounded or curved lower surface 98, Fig. 4, said rounded surface 98$^a$ normally bearing upon the upper portion of a plunger 99 held in a suitable recess 100 of each ejector, and normally under the action of a spring 101, tending to lift said plunger.

Connected to the toplift throwing device 97 is a tail piece 102 having a curved arm 103, said tail piece, when the toplift is in its lowered position, being engaged with a pin 104 projecting from a lug 82$^x$ on the bearing 82, but when the ejector is lifted to eject a toplift, in the manner hereinbefore described, said tail piece 102 is, of course, likewise lifted with respect to the locking pin 104, and, as the lower end of the tail piece 102 moves from engagement with the locking pin 104, the plunger 99 will be projected by its spring and cause the toplift throwing device to be moved by a sudden impulse into the position indicated by dotted lines in Fig. 4, thereby throwing the toplift from the machine into a suitable receptacle that may be provided therefor. As the ejector is lowered by its spring 83, the curved arm 103 will ride over the locking pin 104 and cause the toplift throwing device 97 to act upon the plunger 99 and force the same inward against the tension of its spring 101, the parts assuming the position indicated by full lines in Fig. 4.

The particular means herein described for compressing and ejecting the toplifts have been found to be convenient mechanical expedients for the intended purposes, but it is to be understood that the invention is not circumscribed by these details except in so far as definitely pointed out by the claims. It will also be noted from the invention herein described that the toplift is not compressed to its edges, but the compression is confined to forcing the upper and lower surfaces of the toplift toward each other in compressing the thickness of the toplift.

What is claimed is:

1. In a machine for compressing toplifts, the combination of a supporting frame, a compression die sustained thereby, a cross-head having a central compressing portion for sustaining a toplift and side openings therethrough at each side of the compression position, means for feeding a toplift to said central portion of the cross-head to be compressed and to either side thereof to be ejected, means passing through each of the side openings of the cross-head to eject the toplift when moved to either side of the cross-head, and means for raising and lowering the cross-head.

2. In a machine for compressing toplifts, the combination of a cross-head having a central toplift sustaining portion and an opening at each side thereof, a compression die sustained in position opposite the central portion of the cross-head, a toplift slide having two openings and movable with and on the cross-head, an ejector normally disposed below each of the side openings of the cross-head, a throwing device associated with each ejector to throw the toplift from the machine, and means to move the ejectors through said openings to eject a toplift when moved by the slide over either of said side openings in the cross-head.

3. In a machine for compressing toplifts, the combination of a cross-head having a central toplift sustaining portion and an opening at each side thereof, a compression die sustained in position opposite the central portion of the cross-head, a toplift slide movable with and on the cross-head and having two openings to receive toplifts, means to yieldingly move the toplift slide on said cross-head, an ejector normally disposed below each of the side openings of the cross-head, means to move the ejectors through said openings to eject a toplift when moved by the slide over one of said side openings in the cross-head, and a throwing device coöperating with each ejector to throw the toplift from the machine.

4. In a machine for compressing toplifts, the combination of a cross-head having a central toplift sustaining portion and an opening at each side thereof, a compression die sustained in position opposite the central portion of the cross-head, a toplift slide movable with and transversely on the cross-head, a shaft, a pinion splined to and movable on the shaft as the cross-head is raised and lowered, a rack movable transversely of the cross-head, an ejector normally disposed below each of the side openings of the cross-head, and means to move the ejectors through said openings to eject a toplift when moved by the slide over one of said side openings in the cross-head.

5. In a machine for compressing toplifts, the combination of a cross-head, a presser plate disposed centrally of the cross-head to sustain a toplift while being compressed, said cross-head having an opening at each side thereof, a toplift slide movable with and on the cross-head and having two toplift openings therein, a compression die disposed above the central portion of the cross-head, a toplift ejector carried by the cross-head adjacent each opening therein and having a toplift throwing device mounted thereon, means for moving the toplift slide to carry a compressed toplift over one of said openings, and means to move the ejectors through said openings to eject a toplift from the opening of the slide above one of the ejectors and throw it from the machine.

6. In a machine for compressing toplifts, the combination of a cross-head, a presser plate disposed centrally of the cross-head to sustain a toplift while being compressed, said cross-head having an opening at each side thereof, a toplift slide movable with and on the cross-head and having two toplift openings therein, a compression die disposed above the central portion of the cross-head, a toplift ejector carried by the cross-head adjacent each opening therein and having movably mounted thereon a toplift throwing device, means for moving the toplift slide to carry a compressed toplift over one of said openings, and means to move the ejectors through said openings to eject a toplift from the opening of the slide above one of the ejectors.

7. In a machine for compressing toplifts, the combination of a cross-head, a toplift slide movable with and on said cross-head and having a toplift opening therethrough, a compression die disposed opposite the cross-head, an ejector movable with relation to the toplift slide to eject a compressed toplift therefrom, and a throwing device mounted on the ejector and means for moving the throwing device with relation thereto to throw a compressed toplift out of the machine.

8. In a machine for compressing toplifts, the combination of a cross-head, a toplift slide movable with and on said cross-head and having a toplift opening therethrough, a compression die disposed opposite the cross-head, an ejector mounted on the cross-head and movable with relation to the toplift slide to eject a compressed toplift therefrom, and a throwing device mounted on the ejector and means other than the ejector for acting on the throwing device and moving it with relation thereto to throw a compressed toplift out of the machine.

9. In a toplift compressing machine, a compression die, a cross-head for holding a toplift as it is being compressed, means for relatively moving the compression die and cross-head to compress and release a toplift, an ejector having a toplift throwing device connected thereto, and spring actuated means rendered effective upon movement of the ejector to cause a toplift to be thrown from the machine by said throwing device.

10. In a toplift compressing machine, a compression die, a cross-head for holding a toplift as it is being compressed, means for relatively moving the compression die and cross-head to compress and release a toplift, an ejector having a toplift throwing device connected thereto, and means carried by the ejector and operative upon movement of the ejector to actuate the throwing device to cause a toplift to be thrown from the machine.

11. In a toplift compressing machine, the combination of a compression die and a toplift supporting member to sustain a toplift while being compressed, means to relatively move the compression die and supporting member to compress a toplift, and a toplift ejector having a toplift throwing device mounted thereon and means carried by the ejector to cause the throwing device to throw a toplift when the ejector is moved.

12. In a toplift compressing machine, the combination of a compression die and a toplift supporting member to sustain a toplift while being compressed, means to relatively move the compression die and supporting member to compress a toplift, a toplift ejector having a toplift throwing device movably mounted thereon, means carried by the ejector and acting as the ejector is moved in one direction to operate the throwing device, and means to return the throwing device to initial position as the ejector is moved in the other direction.

13. In a toplift compressing machine, the combination of a compression die and a toplift supporting member to sustain a toplift while being compressed, means to relatively move the compression die and supporting member to compress a toplift, a toplift ejector having a toplift engaging member pivotally connected thereto, and means mounted on the ejector for turning the engaging member on its pivot as the ejector is moved to eject a toplift.

14. In a toplift compressing machine, the combination of a compression die and a toplift supporting member to sustain a toplift while being compressed, means to relatively move the compression die and supporting member to compress a toplift, a toplift ejector, a toplift engaging member carried by the ejector, means to cause the engaging member to engage the toplift after having been compressed and means to then turn the engaging member relative to the ejector to move the toplift to one side.

15. In a toplift compressing machine, the combination of a compression die and a toplift supporting member to sustain a toplift while being compressed, means to relatively move the compression die and supporting member to compress a toplift, a toplift ejector, a toplift engaging member, means to cause said engaging member to move with the ejector to engage a toplift after it has been compressed, and means carried by and movable with the ejector for causing the engaging member to tilt relatively to said ejector to throw the toplift laterally.

16. In a toplift compressing machine, the combination of a compression die and a toplift supporting member to sustain a toplift while being compressed, means to relatively move the compression die and supporting member to compress a toplift, a toplift ejector, a toplift engaging member normally out of contact with the toplift while being compressed, means to cause said engaging member to move with the ejector and engage a toplift after it has been compressed, means for causing the engaging member to tilt relatively to said ejector to throw the toplift laterally, and means for returning the engaging member to initial position.

17. In a toplift compressing machine, the combination of a supporting frame, a compression die, a stem detachably carrying said die, means for adjusting the length of the stem to determine the compression, a lever acting on said stem, a powerful spring 47 acting on said lever to hold the die in fixed position under normal compression action, a socket or seat 48 on the main frame containing said spring, a cross-head on which a toplift may be supported, and means for causing relative approach and separation of the compression die and cross-head.

18. In a toplift compressing machine, the combination of a compression die, a cross-head for supporting a toplift for the action of the die, a toplift slide having a rack, a shaft extending in the direction of movement of the cross-head, a pinion mounted on said shaft to have a limited independent rotative movement thereon and movable longitudinally of the shaft as the cross-head reciprocates, and means for turning said shaft and pinion to carry the slide to its limit of movement and continuing rotative movement of the shaft after the pinion has been stopped by the slide.

19. In a toplift compressing machine, the combination of a compression die, a cross-head for supporting a toplift for the action of the die, a toplift slide having a rack, a shaft extending in the direction of movement of the cross-head, a pinion mounted on said shaft to have a limited independent and yieldingly controlled rotative movement thereon and movable longitudinally of the shaft as the cross-head reciprocates, and a rack and pinion for reciprocating said shaft and said first named pinion until said first named pinion is stopped by the slide as it reaches its limit of movement and continuing the movement of the shaft.

20. In a toplift compressing machine, the combination of a compression die and co-operating cross-head for holding a toplift as it is being compressed, means for relatively moving the die and cross-head, an ejector movable through the cross-head in the direction of cross-head movement, a toplift throwing device carried by the ejector and movable through the cross-head, and means to cause the throwing device to engage and throw a toplift from the machine after it has been compressed.

21. In a toplift compressing machine, the combination of a compression die and co-operating cross-head for holding a toplift as it is being compressed, means for relatively moving the die and cross-head, an ejector movable through the cross-head in the direction of cross-head movement, a toplift throwing device carried by the ejector and movable through the cross-head, a spring for causing the throwing device to throw a toplift out of the machine, and means to free the spring for such action as the ejector is moved.

22. In a toplift compressing machine, the combination of a compression die, a cross-head, means for relatively moving the die and cross-head to compress a toplift carried by one of them, an ejector movable in the direction of such relative movement of the die and cross-head, a throwing device movable with the ejector, means acting normally to cause the throwing device to move relatively to the ejector, and means acting normally to restrain such movement and to free the throwing device to the action of its actuating means when the ejector is moved.

23. In a toplift compressing machine, the combination of a compression die, a cross-head, means for relatively moving the die and cross-head to compress a toplift carried by one of them, an ejector movable in the direction of such relative movement of the die and cross-head, a throwing device movable with the ejector, a spring normally acting to move the throwing device, and a lock to restrain the action of the spring and to free the throwing device to movement responsive to the spring when the ejector is moved.

24. In a toplift compressing machine, the combination of a supporting frame, a compression die 34, a stem detachably carrying said die, an adjusting member 37 having a lug or projection 39, a lever 41 having a seat 40 for said lug, a spring 47 acting on the free end of the lever, and a seat 48 on the main frame for said spring.

25. In a machine for compressing toplifts, the combination of a compression die and cross-head, means for relatively moving them to compress a toplift, a slide movable transversely on the cross-head and having two openings to receive toplifts, an ejector on the cross-head beneath each of said openings, a shaft 86 carried by the main frame and having arms 87 adapted to contact with the lower ends of the ejectors, a shaft 21 and its cam, and connections between the shaft 86 and said cam for causing the ejectors to move through the cross-head when the latter is in its lowered position.

In testimony whereof, I have signed my name to this specification, in the presence of two subscribing witnesses.

CHARLES P. STANBON.

Witnesses:
ROSWELL F. HATCH,
REDFIELD H. ALLEN.